United States Patent
Burrows et al.

(10) Patent No.: US 7,567,973 B1
(45) Date of Patent: *Jul. 28, 2009

(54) STORING A SPARSE TABLE USING LOCALITY GROUPS

(75) Inventors: Michael Burrows, Palo Alto, CA (US); Fay Wen Chang, Greenwich, CT (US); Jeffrey A. Dean, Palo Alto, CA (US); Andrew B. Fikes, Los Altos, CA (US); Sanjay Ghemawat, Mountain View, CA (US); Wilson C. Hsieh, New York, NY (US); Deborah Anne Wallach, Mountain View, CA (US)

(73) Assignee: Google Inc., Mountain View, CA (US)

( * ) Notice: Subject to any disclaimer, the term of this patent is extended or adjusted under 35 U.S.C. 154(b) by 408 days.

This patent is subject to a terminal disclaimer.

(21) Appl. No.: 11/197,924

(22) Filed: Aug. 5, 2005

(51) Int. Cl.
*G06F 17/30* (2006.01)

(52) U.S. Cl. ........................ 707/101; 707/100

(58) Field of Classification Search ............ 707/1, 707/2, 3, 4, 101, 104.1, 200
See application file for complete search history.

(56) References Cited

U.S. PATENT DOCUMENTS

| | | | | |
|---|---|---|---|---|
| 5,386,559 | A | | 1/1995 | Eisenberg et al. ............ 395/600 |
| 5,414,834 | A | | 5/1995 | Alexander et al. .......... 395/600 |
| 5,729,730 | A | * | 3/1998 | Wlaschin et al. ................ 707/3 |
| 5,856,826 | A | * | 1/1999 | Craycroft ..................... 715/788 |
| 5,918,225 | A | | 6/1999 | White et al. .................... 707/3 |
| 6,169,990 | B1 | | 1/2001 | McGregor et al. .......... 707/101 |
| 6,182,121 | B1 | * | 1/2001 | Wlaschin ..................... 709/215 |
| 6,289,358 | B1 | | 9/2001 | Mattis et al. ................ 707/203 |
| 6,298,342 | B1 | * | 10/2001 | Graefe et al. .................. 707/4 |
| 6,430,549 | B1 | * | 8/2002 | Gershfield et al. ............. 707/2 |
| 6,618,737 | B2 | * | 9/2003 | Aridor et al. ................ 707/205 |
| 6,636,870 | B2 | * | 10/2003 | Roccaforte ............... 707/104.1 |
| 6,778,996 | B2 | * | 8/2004 | Roccaforte ............... 707/104.1 |
| 6,879,984 | B2 | | 4/2005 | Duddleson et al. .......... 707/101 |
| 7,024,414 | B2 | | 4/2006 | Sah et al. .................... 707/101 |

(Continued)

OTHER PUBLICATIONS

Barroso, L., et al., "Memory System Characterization of Commercial Workloads," Proceedings of the 25th International Symposium on Computer Architecture, Barcelona, Jun. 1998, pp. 3-14.

(Continued)

*Primary Examiner*—Neveen Abel Jalil
(74) *Attorney, Agent, or Firm*—Morgan, Lewis & Bockius LLP (57) ABSTRACT

Each of a plurality of data items is stored in a table data structure. The table structure includes a plurality of columns. Each of the columns is associated with one of a plurality of locality groups. Each locality group is stored as one or more corresponding locality group files that include the data items in the columns associated with the respective locality group. In some embodiments, the columns of the table data structure may be grouped into groups of columns and each group of columns is associated with one of a plurality of locality groups. Each locality group is stored as one or more corresponding locality group files that include the data items in the group of columns associated with the respective locality group.

16 Claims, 8 Drawing Sheets

U.S. PATENT DOCUMENTS

| | | | |
|---|---|---|---|
| 7,085,768 B2 * | 8/2006 | Scott et al. | 707/101 |
| 7,103,588 B2 | 9/2006 | Beck et al. | 707/2 |
| 2002/0038301 A1 * | 3/2002 | Aridor et al. | 707/103 |
| 2003/0200235 A1 | 10/2003 | Choy et al. | 707/203 |
| 2003/0204534 A1 * | 10/2003 | Hopeman et al. | 707/200 |
| 2004/0236728 A1 * | 11/2004 | Newman et al. | 707/203 |
| 2005/0120293 A1 * | 6/2005 | Benhase et al. | 715/504 |
| 2005/0149584 A1 | 7/2005 | Bourbonnais et al. | 707/204 |

OTHER PUBLICATIONS

Elmasri, R., et al., Portions of Chapters 24 and 25 of Fundamentals of Database Systems, Addison-Wesley, Reading, MA, 2004, pp. 767-819.

Gamal-Eldin, M.S., et al., "Integrating Relational Databases with Support for Updates," Proceedings of 1988 Int'l Symposium on Databases in Parallel and Distributed Systems, Dec. 5, 1988, pp. 202-209.

Kouramajian, V., et al., "Mapping of 2-D Temporal Extended ER models in Temporal FNF and NFNF Relational Models," Int'l Conf on the Entity-Relationship Approach, Amsterdam, Netherlands, Oct. 23, 1991, pp. 671-689.

\* cited by examiner

Physical Storage of Locality Group Files (key- value pairs)

STORING A SPARSE TABLE USING LOCALITY GROUPS

RELATED APPLICATIONS

This application is related to U.S. patent application Ser. No. 11/197,925, "Large Scale Data Storage in Sparse Tables", filed Aug. 5, 2005, which application is incorporated by reference herein in its entirety.

This application is related to U.S. patent application Ser. No. 11/197,923, "Data Reconstruction from Shared Update Log", filed Aug. 5, 2005, which application is incorporated by reference herein in its entirety.

This application is related to U.S. patent application Ser. No. 11/197,922, "Data Compression of Large Scale Data Stored in Sparse Tables", filed Aug. 5, 2005, which application is incorporated by reference herein in its entirety.

TECHNICAL FIELD

The disclosed embodiments relate generally to data storage in distributed computer systems, and more particularly to storage of a sparse table as a set of locality group files.

BACKGROUND

Table data structures, and particularly tables in database management systems, are used to store large amounts of data. The demand for efficient data storage for a variety of data intensive applications continues to grow. However, for many such data intensive applications, table data structures have been assumed to be an inappropriate mechanism for storing much of the data generated or obtained by those applications. Furthermore, there appears to be little appreciation that the paradigms associated with table data structures would be very useful in those applications.

A table data structure paradigm can be very useful for storing large amounts of data. However, using a table data structure to store data in a distributed data management system can pose its own challenges. One challenge is how to distribute the data amongst the machines in the distributed system such that a data access does not involve accessing an excessively large number of files across the system. Accessing a large number of files across the system can reduce the overall efficiency of the system.

Accordingly, it is highly desirable to provide a more efficient manner of storing the data of a table data structure across a distributed system.

SUMMARY

Each of a plurality of data items is stored in a table data structure. The table structure includes a plurality of columns. Each of the columns is associated with one of a plurality of locality groups. Each locality group is stored as one or more corresponding locality group files that include the data items in the columns associated with the respective locality group.

In some embodiments, the columns of the table data structure may be grouped into groups of columns. Each of the groups of columns is associated with one of a plurality of locality groups. Each locality group is stored as one or more corresponding locality group files that include the data items in the group of columns associated with the respective locality group.

BRIEF DESCRIPTION OF THE DRAWINGS

FIG. 5A is a block diagram of the files and memory state used by one server to store tablets (portions of tables) and updates to the tablets, while

Like reference numerals refer to corresponding parts throughout the drawings.

DESCRIPTION OF EMBODIMENTS

Figure 1:
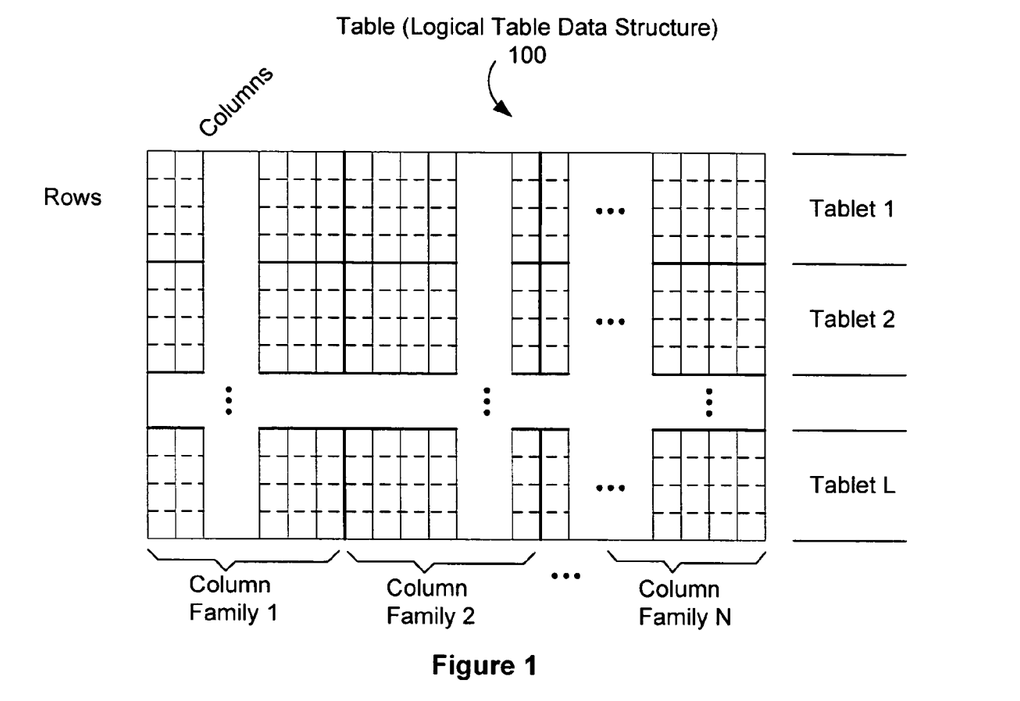
FIG. 1 is a conceptual block diagram of a table data structure.

FIG. 1 is a conceptual block diagram of a table data structure 100. Like an ordinary table, the table data structure has rows and columns. The columns are grouped into column families. Thus, each column family of a table includes one or more columns of the table. Contiguous sets of the rows are grouped to form "tablets." A tablet contains all the data in the table in a corresponding set of rows. The table 100 is sorted (at least conceptually) by row, sometimes called the row identifier. Thus, if the contents of the table were to be scanned from beginning to end, the contents would be accessed in row order. Existing tablets can be split to increase the number of tablets, or merged to reduce the number of tablets.

The column family is the basic unit for controlling accessing to data. Thus, if the administrator of a table wants to restrict access to the contents in a first set of columns, but to allow unrestricted or less restricted access to a second set of columns, the columns in the first set are assigned to a first column family while the columns in the second set of assigned to a second (i.e., different) column family. As described below, the metadata for the table includes separate sets of security parameters (sometimes called access control parameters) for each column family of the table. When a column family has no access restrictions, the security parameters may either be set to default values, or in some embodiments, those security parameters need not be stored in the table's metadata at all.

The tablet is the basic logical unit of storage for purposes of distributing portions of a table across a set of files. Tablets are logical units of storage, as opposed to physical units of storage, because the content of a tablet may be stored in multiple files. In fact, as described below, even a relatively simple tablet will be stored in more than file (at least temporarily) if the content of the tablet is updated. Tablets are sometimes herein called data sets.

In some embodiments, each row identifier is a string of arbitrary length and arbitrary value. Similarly, in some embodiments each column identifier is a string of arbitrary length and arbitrary value. In other words, in these embodiments, there are no length limitations and no (or few) value limitations placed on row and column names or identifiers. In some other embodiments, restrictions may be placed on the value of a row or column identifier. For example, the column identifier string may have to comply with a rule that disallows use of particular characters or symbols, or that requires the use of only printable characters or symbols. The rule may further disallow the use of a particular printable character, such as the colon character, except as a separator between first and second portions of the column identifier. In some embodiments, column names are segmented into a column family portion and a qualifier portion (sometimes called the column portion), separated by a predefined separator character or symbol. For example, a column name may have format such as cf1:c2, where the colon is the separator character. In these embodiments, the column family name and the qualifier portion of a column name can each be arbitrarily long and have arbitrary value; however the column family name may have to comply with a rule that disallows use of the predefined separator character in the column family name and/or in the qualifier portion of the column name.

Figure 2:
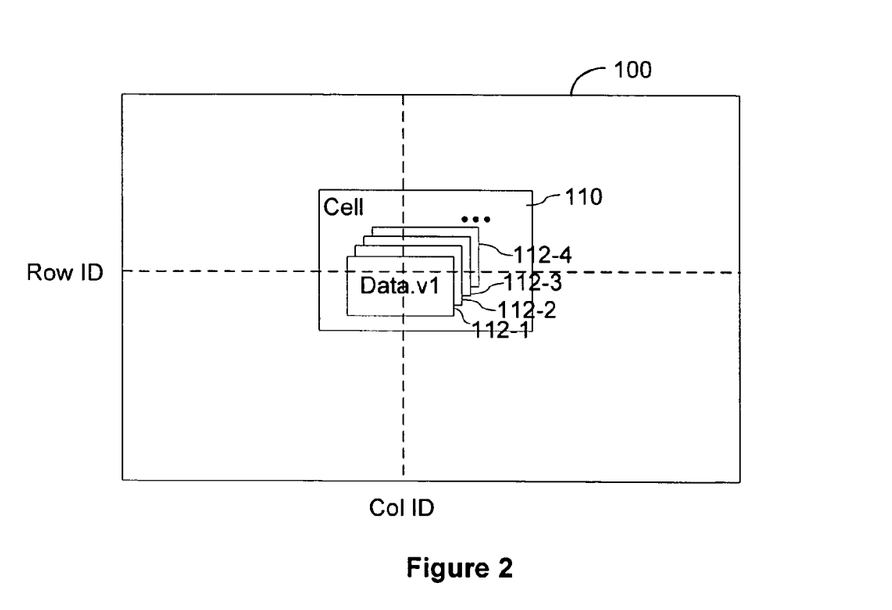
FIG. 2 is a conceptual block diagram illustrating storage of multiple versions of a data item in a single cell of a table.

As shown in FIG. 2, a cell 110 in a table 100 represents the junction of a specified row (Row ID) and column (Col ID). Furthermore, multiple versions 112 of a data item can be stored in a single cell of a table. Each version of the data is assigned either a version number or timestamp. In the remainder of this document, each data item is described as having an associated timestamp, but it is to be understood that the timestamp may be replaced by or treated as a version number.

Figure 3:
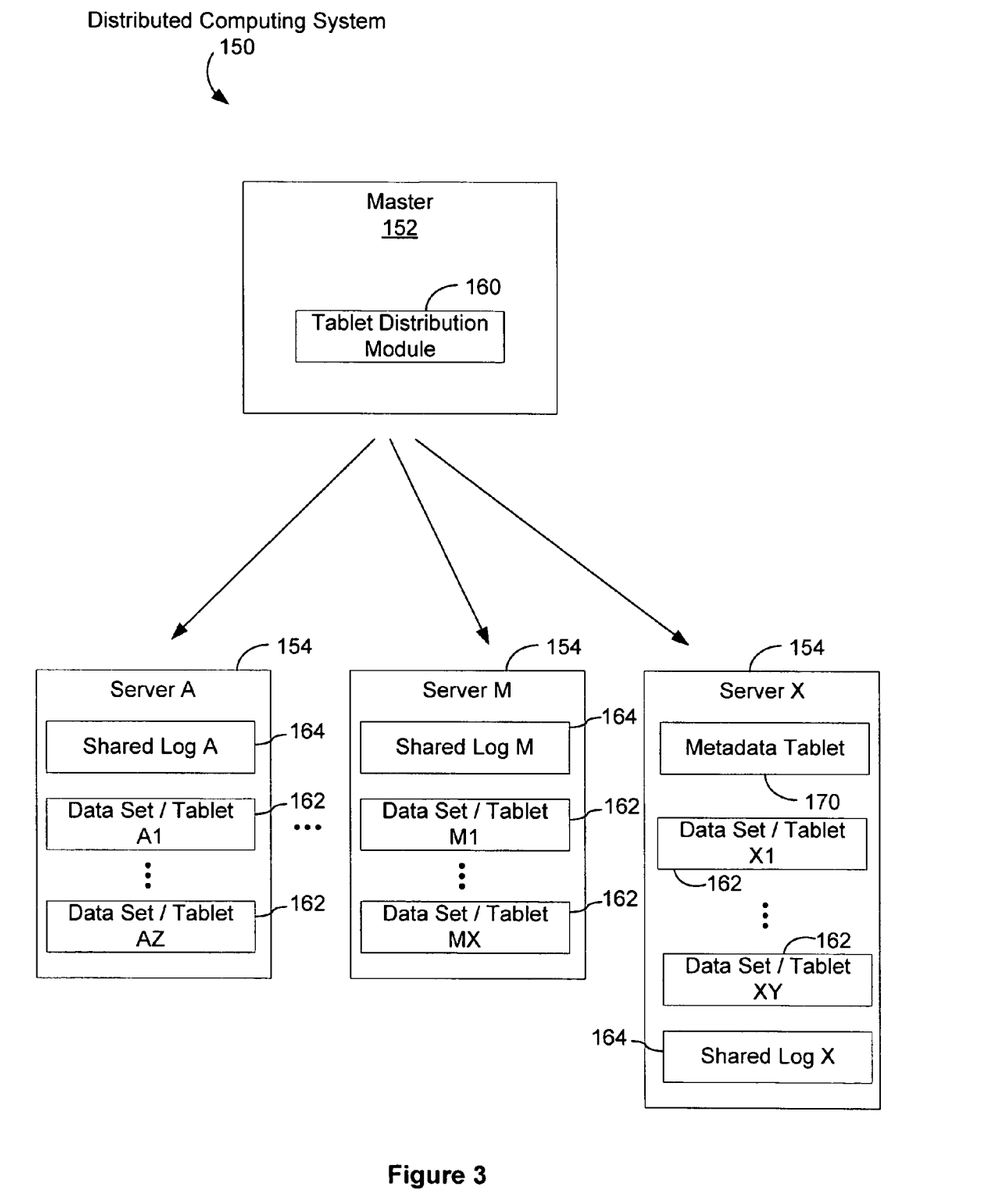
FIG. 3 is a block diagram illustrating a distributed system having a master and a plurality of data servers.

FIG. 3 is a block diagram illustrating a distributed computing system 150 having a master computer 152 and multiple servers 154, sometimes herein called data servers or tablet servers. The master computer 152 has a module 160 or programs for distributing tablets (table portions) among the servers 154. Each server 154 stores a plurality of tablets 162. The number of tablets may vary from one server to another. The master 152 may allocate tablets to servers based on load balancing criteria, resource availability, and other criteria. In some embodiments, a single system 150 (sometimes called a data center) includes hundreds or thousands of servers 154, and the number of tablets 162 stored in a single system may number in the thousands, hundreds of thousands or millions.

Each server 154 also has a shared log 164, which stores update records reflecting changes made to the tablets allocated to that server 154. The shared log 164 is stored as a sequence of files, each of which is automatically replicated by a distributed file system so that instances (sometimes called replicas or copies) of the file are stored on at least three distinct servers 154. Similarly, each of the files that stores the contents of the tablets is automatically replicated by the distributed file system so that instances (sometimes called replicas or copies) of the file are stored on at least three distinct servers. As a result, when a server 154 fails, all of the tablet files and log files of the failed server are available on other servers of the system. When recovering from a server failure, the master 152 reallocates all the tablets of the failed server to other servers 154, preferably distributing the load associated with those tablets across many servers.

Figure 4A:
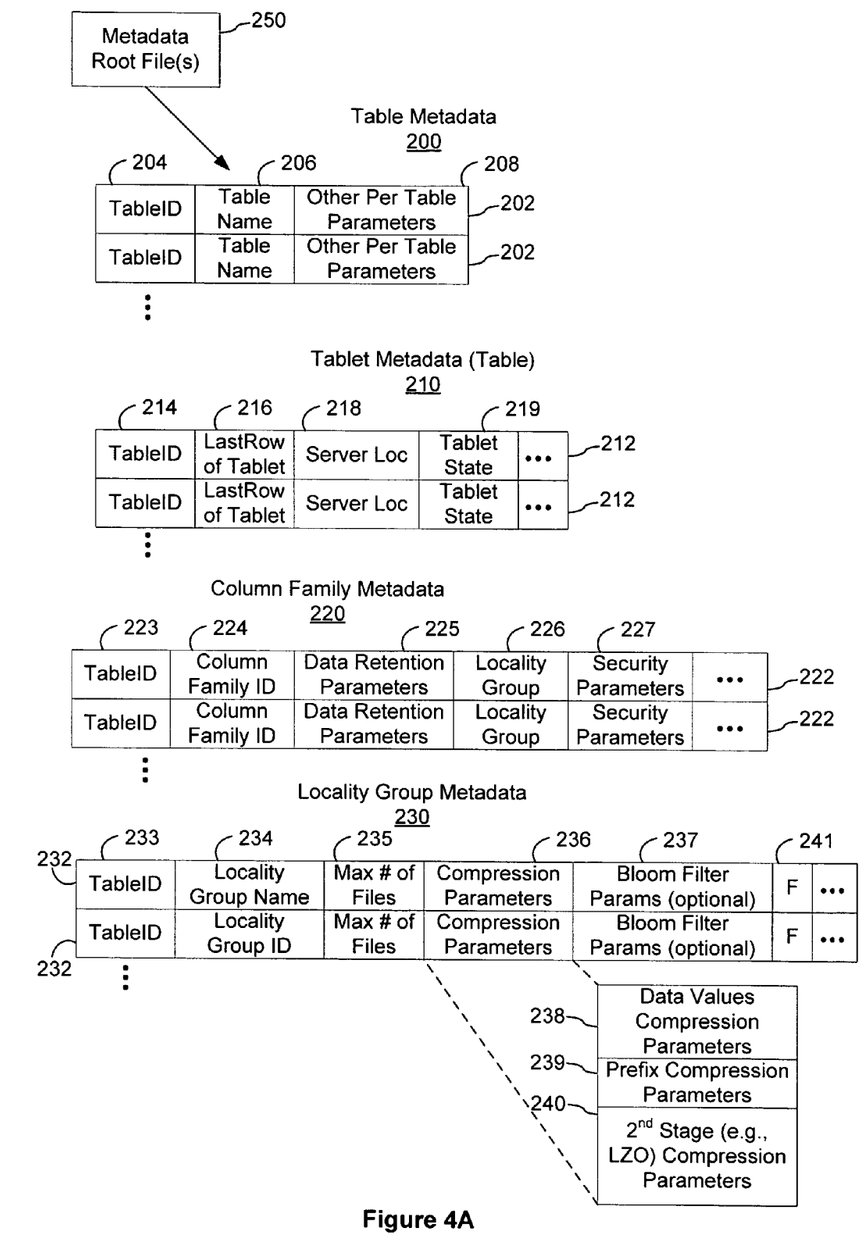
FIGS. 4A and 4B are block diagrams of data structures for storing metadata associated with a set of tables.
Figure 4B:
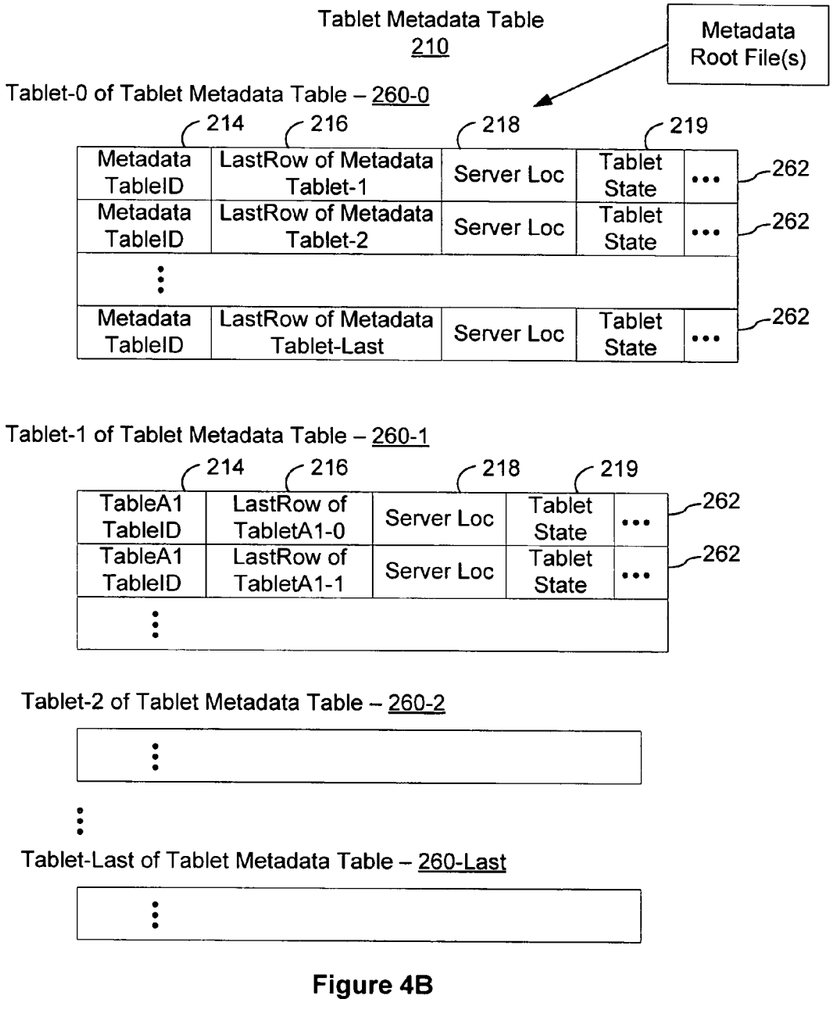

FIGS. 4A and 4B are block diagrams of data structures for storing metadata associated with a set of tables. These figures show four sets of metadata: table metadata 200 (sometimes called per table metadata), tablet metadata 210 (per tablet metadata), column family metadata 220 and locality group metadata 230. One or more metadata root files 250 may be used to store the location of the metadata tables, tablets or files, and thus to bootstrap the system when recovering from a power failure or the like. Some of the metadata sets, such as the table metadata 200 and the column family metadata 220, are sufficiently small that they may be stored in a small number of files having predefined names. At least one of the metadata sets, namely the tablet metadata 210, is sufficiently voluminous in some embodiments that this metadata is itself stored in a table data structure, which in turn has many tablets. In some embodiments, the tablet metadata table 210 contains thousands, hundreds of thousands or millions of entries 212, each of which indicates the location of a distinct respective tablet in the data center (or distributed computer system) 150.

In some embodiments the table metadata 200 includes a record 202 for each distinct table stored in a single data center 150 (i.e., the distributed system of FIG. 3). Each table metadata record 202 may include a table identifier 204, a name of the table 206, and optionally may include other per table parameters 208 (e.g., the identifier of an administrator or creator of the table).

Figure 5A:
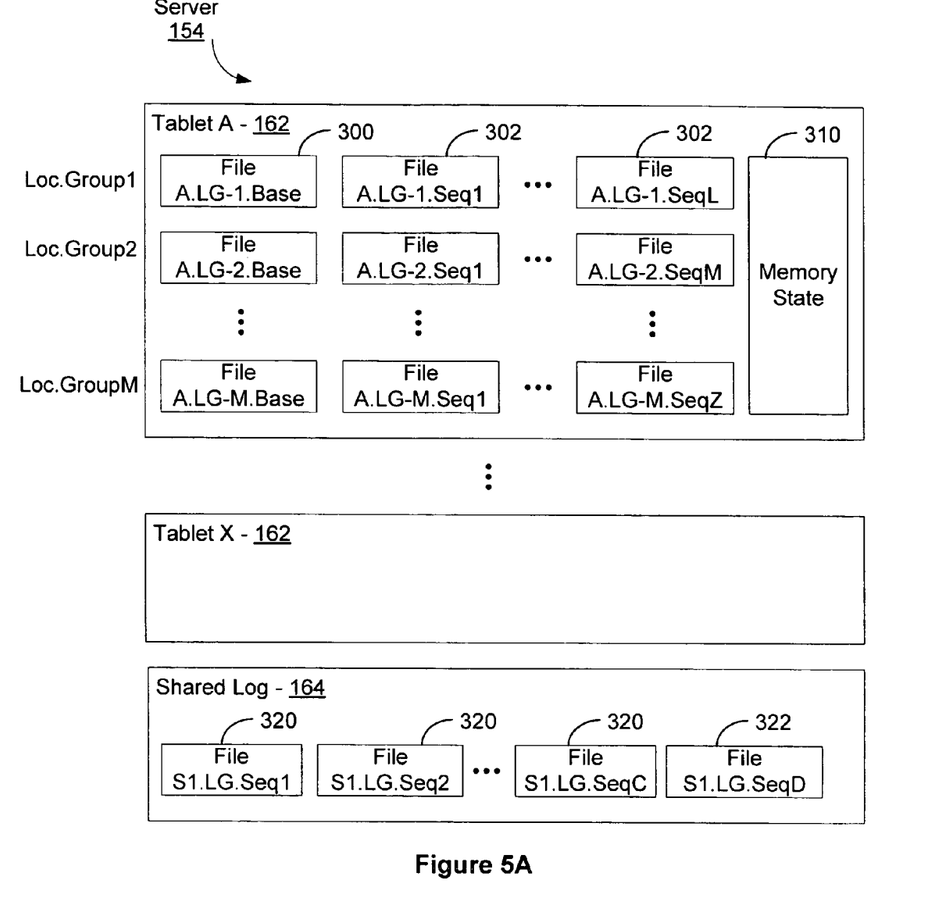

In some embodiments, the tablet metadata 210 includes a record 212 for each distinct tablet stored in a single data center 150. Each tablet metadata record 212 may include a table identifier 214, the name of the last row of the tablet 216, an identifier or location 218 of the server to which the tablet is assigned (i.e., the server which handles access to and updates to the tablet), and a set of information 219 representing the state of the tablet. In some embodiments, tablet state information 219 includes a list of the files (see files 300, 302, FIG. 5) that store the content of the tablet, a list of the sub-log files 320, 322 (FIG. 5) that would be needed to recover the state of the tablet in a failover, and a log position indicating the position of the first update record in the shared log 164 to be used for recovering the state of the tablet in a failover. The tablet metadata records 212 may optionally include additional fields. The combination of the table identifier 214 and last row name or identifier 216 may be considered to be the key of the tablet metadata table 210, because all the tablet metadata records 212 are ordered within the tablet metadata table 210 in accordance with the table identifier concatenated with the last row name or identifier. In some other embodiments, each tablet metadata record may include the table identifier and the name of the first row of the next tablet in the table as the key of tablet metadata table. If a tablet is the last tablet of a table, a predefined "infinity" designation may be used in place of the name of the (non-existent) first row in the next tablet in the table.

The range of rows included in any particular tablet is specified by the last row name or identifiers in two tablet metadata records 212: the record 212 of the particular tablet and the immediately preceding record 212 in the tablet metadata table. If the immediately preceding record 212 in the tablet metadata table has a different table identifier, then the current tablet is the first tablet of its table.

To locate the tablet that stores a specified row of a table, the tablet metadata 210 is search or scanned until the first tablet metadata record is found that (A) has the same table identifier as the tablet and (B) has a last row that is equal (i.e., has the same value or sort value) or greater (i.e., has a higher value, or sort value) than the specified row. This record identifies the tablet that stores the specified row, and the server location 218 specified by the record identifies the server which handles access to the identified tablet. In the embodiments where the tablet key is the table identifier and the name of the first row of the next tablet of the table, the record identifying the tablet that stores a specified row of a table is located by scanning the tablet metadata until the first tablet metadata record is found that (A) has the same table identifier as the tablet and (B) has a first row (of the next tablet) name that is greater (i.e., has a higher value, or sort value) than the specified row.

In some embodiments, the servers 154 and the master 152 of the data center may each maintain a cache of recently accessed tablet-to-location mappings. This may speed up the process of locating tablets by having locations for frequently accessed tablets more readily available.

As shown in FIG. 4B, in a first tablet 260-0 of the tablet metadata table 210 all the entries 262 have table identifiers 214 equal to the predefined identifier of the tablet metadata table. In addition, the last row field 216 of each entry 262 of the first tablet 260-0 matches the concatenation of the table identifier 214 and the last row 216 of a last entry 262 in another respective one of the tablets 260 (e.g., tablet 260-1) of the tablet metadata table 210. The server that hosts the first tablet 260-0 of the tablet metadata table 210 is identified by a metadata root file 250, which has a predefined file name and can therefore be located whenever the distributed computer system 150 is restarted. Thus, to retrieve a value having a specified key in a specified table, the process is as follows. This description assumes the tablet locations haven't been cached. The first tablet 260-0 of the tablet metadata is searched to identify and locate the tablet metadata tablet for the specified table. Then the identified tablet metadata tablet is searched to locate the entry for the specified key, which identifies the tablet containing the specified key-value pair and also identifies the server that hosts the tablet. Finally, the process continues at the hosting server, by searching the identified tablet to locate the value at the specified key. For many data access operations, one or both metadata entries in the tablet metadata will have been cached, making the access process even more efficient.

Referring again to FIG. 4A, in some embodiments, the column family metadata 220 includes a record 222 for each column family of each distinct table stored in a single data center 150. Each column family metadata record 222 may include a table identifier 223, the name or identifier 223 of the column family 216, a set of data retention parameters 225, and the name or identifier of the locality group 226 to which the column family is assigned. Column family metadata records 222 may optionally include additional fields. In some embodiments, the column family metadata 220 is stored on a per-table basis and may be stored together with the table metadata 200 and the locality group metadata 230. In these embodiments, the table metadata 200, column family metadata 220 and locality group metadata 230 for each distinct table are stored together in a corresponding metadata file.

In some embodiments, the data retention parameters 225 can include a parameter that specifies a maximum number of data items to be retained in each cell of the column family. Alternately stated, when a non-zero value maximum number is provided, and the data items stored in a cell exceed the specified maximum number, the oldest data items in the cell (as indicated by the timestamps or versions numbers of the data items) can be deleted or garbage collected until the number of items in the cell is reduced to the specified maximum number. The garbage collection of excess data items need not occur immediately, and thus may be performed at scheduled times or whenever the load on the server falls below a predefined level.

In some embodiments, the data retention parameters 225 can include a parameter that specifies a maximum age (also called an age limit) of data items to be retained in each cell of the column family. Alternately stated, when a non-zero value maximum age is provided, and any of the data items stored in a cell have an age (as indicated by the timestamps of the data items) that exceeds the specified maximum age, those data items in the cell can be deleted or garbage collected. The garbage collection of data items whose age is greater than the specified age limit need not occur immediately, and thus may be performed at scheduled times or whenever the load on the server falls below a predefined level.

In some embodiments, the data retention parameters 225 can include a first parameter that specifies a maximum age and a second parameter that specifies a maximum number of data items per cell in the column family.

In some embodiments, the column family metadata may include security parameters 227 to govern access to data in any of the columns in the column family. For instance, these parameters may restrict access so that ordinary users have only read access to the data in the columns of the column family, while other classes of users, such as those with administrator rights, have both read and write access. The access rights for one column family in a table may differ from the access rights for another column family in the same table.

In some embodiments, the locality group metadata 230 includes a record 232 for each locality group of each distinct table stored in a single data center 150. Each locality group metadata record 232 may include a table identifier 233, the name or identifier 234 of a respective locality group, a field 235 indicating the maximum number of files used to store the locality group, and a set of compression parameters 236. The locality group metadata records 232 may optionally include a set of Bloom filter parameters 237, and may optionally include additional fields, such as a location flag 241. In some embodiments, the compression parameters 236 include one set of compression parameters 238 for compressing the data values in a locality group, another set of compression parameters 239 for compressing the key values in a locality group, and yet another set of compression parameters 240 for performing a secondary compression of the result produced by compressing the data values and keys. In some embodiments, a key value may include a string of four values such as r.cf.c.ts, where "r" represents a row identifier, "cf" represents a column family name or identifier, "c" represents a column name or identifier and "ts" represent a timestamp or version number or version identifier. As described in more detail below, the values in a table data structure may be stored as key-value pairs, where each key identifies the location of the value in the table, as well as the timestamp or version number of the corresponding value. Every key in a table, tablet or locality group is unique with respect to all the other keys in the same table, tablet or locality group. In some embodiments, the locality group metadata 230 is stored on a per-table basis and may be stored together with the table metadata 200 and the column family metadata 220. In these embodiments, the table metadata 200, column family metadata 220 and locality group metadata 230 for each distinct table are stored together in a corresponding metadata file.

The optional Bloom filter parameters 237 are provided when a Bloom filter is used to block attempts to access nonexistent entries in the locality group. In some embodiments, when Bloom filters are used with a locality group, the Bloom filters are stored in each of the files used to the store the locality group (i.e., each file includes its own Bloom filter). Every time an item is added to the locality group, within a particular tablet, the key of the item is hashed and used to update the Bloom filter. Whenever an attempt is made to read the item corresponding to a specified key, the Bloom filter is checked to see if the locality group, within the particular tablet, contains or may contain the item. If the Bloom filter returns a negative result, the item is known to not be present in the locality group of the particular tablet, while if the Bloom filter returns a positive result, a value corresponding to the key is likely (but less than 100 percent certain) to be found in the locality group of the particular tablet. The Bloom filter parameters 237 may specify which of the locality group's files have Bloom filters. In some embodiments, the Bloom filter parameters 237 may also specify the number of hash functions to be used and/or the size of the Bloom filter array, while in other embodiments the number of hash functions and the size of the Bloom filter array are automatically determined.

The location flag 241 may be set or reset by a user to designate a locality group for loading into and keeping in volatile memory. For example, if the flag 241 for a locality group is set, then the locality group files corresponding to that locality group are loaded into volatile memory and kept in the volatile memory until the flag is cleared. If the flag 241 is cleared, then the locality group files corresponding to that locality group are not kept in volatile memory. Keeping locality group files in volatile memory may help speed up operations that access the files. It should be appreciated that the shared log is not affected by the state of the location flag.

Figure 5B:
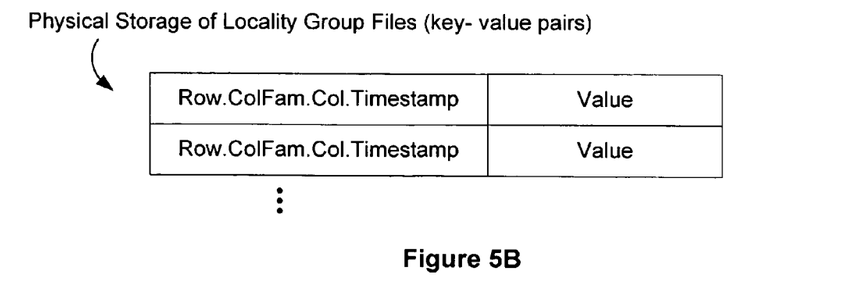
FIG. 5B is a block diagram of the content of a single data file, sometimes called a locality group file.

FIG. 5A is a block diagram of the files used by one server to store tablets 162 and updates to the tablets. As shown, for each locality group in a tablet 162, there is a main or base file 300, and a set of one or more update files 302. In addition, updates to the locality group of the tablet 162 since the last time an update file 302 was produced are stored in a memory state array 310, which is stored in the main memory of the server hosting the tablet 162. As shown in FIG. 5B, each of the locality group files 300, 302 and the memory state 310 contains sets of key-value pairs. In some embodiments, the key value pairs of each locality group file are stored in key sorted order (i.e., starting at a lowest key value in the file and progressing monotonically to the highest key value in the file, or vice versa) along with an index on the keys for fast access. Since the update files 302 of a locality group are created after the creation of the base file 300, the update files 302 may contain new values for some of the same keys found in the base file.

Whenever a compaction trigger event occurs (e.g., episodically, when the memory of a server reaches a predefined level of fullness, or the memory state array 310 reaches a predefined size or level of fullness; periodically, when the passage of a time since a last compaction reaches a predefined threshold; upon a split or merge of a tablet; upon the unloading of a tablet; and/or upon user request), the update information in the memory state array 310 is used to generate new update files 302 for the locality groups for which the memory state array 310 contains updates. If, as a result, the number of files for a locality group exceeds the maximum number of files allowed for that locality group (as specified by either the metadata for the locality group, or by a default value), then two or more of the update files 302 are combined so as to reduce the number of update files 302. In an alternate embodiment, when the number of update files 302 is already at its maximum allowed value for a locality group, the update information in the memory state 310 is added to the newest of the update files.

When performing a "compaction," which means combining two or more locality group files 300, 302, if the same key is found in two files 300, 302, then the newer value for the key is retained and the older value is discarded. If the newer "value" is a deletion, all older values for the key are discarded if the compaction compacts to the base file. If the compaction does not compact to the base file, the deletion "value" is retained.

In some embodiments, a compaction trigger event may trigger either a minor compaction or a major compaction. For example, a minor compaction is triggered when a server's memory reaches a predefined level of fullness. Memory fullness may be based, for example, on the total amount of data stored in the memory state arrays 310 for all the tablets hosted by the server. When a minor compaction is triggered, the server identifies one or more tablets whose memory state arrays have the most data in them, and then writes the information from each of those memory state arrays 310 into one or more locality group files 302. The memory state array 310 is then re-initialized to a predefined empty state. In some embodiments, the minor compaction is performed on successive tablets until the fullness of the server's memory falls below a predefined threshold level of fullness. In other embodiments, each minor compaction trigger event causes only one tablet's memory state array 310 to be converted into one or more locality group files 302. The tablet whose memory state array 310 is converted is selected based on the amount of data stored in the memory state arrays 310 of the tablets hosted by the server, or on a round robin ordering of minor compactions, or on any other appropriate selection mechanism or rule. As noted above, a minor compaction may also include merging locality group files 302 when the number of locality group files for any particular locality group exceeds the maximum number of such locality group files specified for that locality group.

A major compaction is the combining of the base file 300 and all the update files 302 of a locality group so as to form a new base file 300. In some embodiments, a major compaction is triggered periodically, for instance once per day. In these embodiments, a compaction thread is launched upon the triggering of a major compaction. The compaction thread performs a major compaction on the locality files of each tablet, one locality group at a time, within one tablet at a time, until the sets of locality group files of all the tablets hosted by the server have been compacted to form new locality group base files 300. In some other embodiments, major compactions are performed on the locality groups of a tablet, one at a time, in round robin order during successive compaction events. Periodically compacting all the locality group files 300, 302 of each locality group into new base files helps to keep access to the data in the tablets efficient and ensures that deleted data are eventually removed from the system.

In an alternate embodiment, the server 154 includes a separate memory state array 310 for each locality group of each tablet hosted by the server 154.

Each tablet or data server includes a shared log 164. Whenever an update is made to a tablet hosted by the server 164, the update is first committed to the shared log 164, and only when the update is know to be committed to the shared log 164 is the update applied to the memory state array 310. The shared log 164 is stored as a sequence of sub-log files 320. In some embodiments, new updates are added to a current sub-log file 322 until the sub-log file reaches a threshold size, or until a new addition to the current sub-log file 322 would cause the size of the sub-log file to exceed a threshold value. At that point, the current sub-log file is closed and a new sub-log file is created and becomes the current sub-log file to which new updates are added.

The shared log 164 stores a sequence of update records. Each update record indicates a new value for a specified key; the deletion of the value (if any) at a specified key; the deletion of a cell at a specified row and column; or the deletion of an entire row. In some embodiments, a single update record may indicate the deletion of a subset of multiple versions of data values at a cell.

In some embodiments, the tablets, column families, and locality groups are non-overlapping. This means that that a row cannot belong to two tablets at the same time and a column cannot be assigned to two column families or two locality groups at the same time; the ranges of rows between tablets are mutually exclusive and the ranges of columns between column families or between locality groups are mutually exclusive. For example, if a table has rows A, B, C, D, E, the table has two tablets, and a first tablet of the table contains rows A, B, C; then the second tablet contains rows D, E and cannot contain rows A, B, or C because rows A, B, C already belong to the first tablet. As another example, if a table has columns P, Q, R, S, T, the table has two column families, and a first column family of the table contains columns P, Q, R; then the second column family contains columns S, T and cannot contain columns P, Q, or R because columns P, Q, R are already assigned to the first column family.

Figure 6:
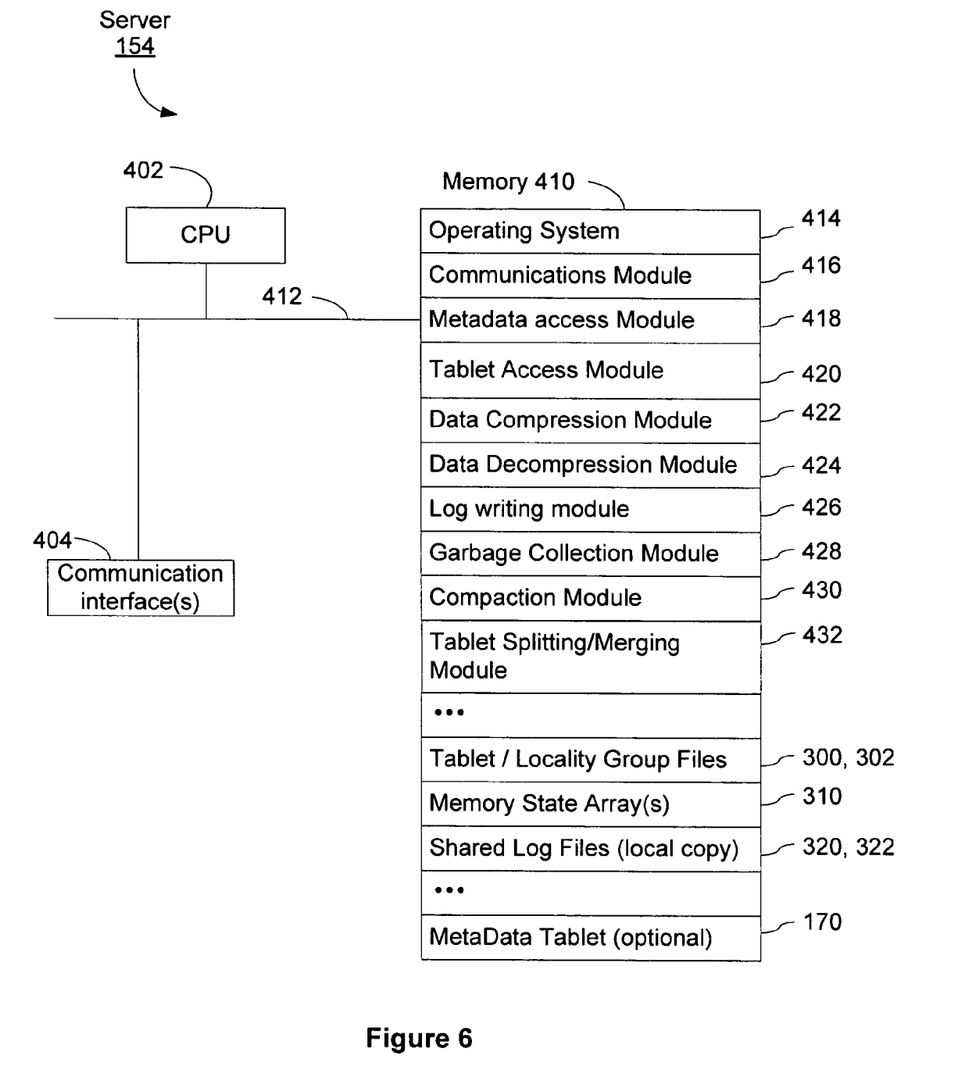
FIG. 6 is a block diagram of a computer, such as a server (sometimes called a data server or tablet server), that participates in a distributed system in which data is stored in a set of tables, portions of which are stored and maintained across a number of interconnected servers.

In some embodiments, a data or tablet server 154, as shown in FIG. 6, includes one or more processing units (CPU's) 402, one or more network or other communications interfaces 404, memory 410, and one or more communication buses 412 for interconnecting these components. Memory 410 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 410 may optionally include one or more storage devices remotely located from the CPU(s) 402. In some embodiments, the memory 410 stores the following programs, modules and data structures, or a subset thereof:

- an operating system 414 that includes procedures for handling various basic system services and for performing hardware dependent tasks;
- a network communication module 416 that is used for connecting the server 154 to other computers via the one or more communication network interfaces 404 and one or more communication networks, such as a local area network, the Internet, other wide area networks, metropolitan area networks, and so on;
- a metadata access module 418 for accessing the metadata for any specified table, tablet, column family or locality group;
- a tablet access module 420, for accessing (i.e., reading and/or writing) data in a specified tablet at a specified row and column of a specified table;
- a data compression module 422 for compressing files; the data compression module 422 may perform data compression of locality group files 300, 302 in accordance with the compression parameters 236 specified for the corresponding locality groups;
- a data decompression module 424 for decompressing compressed files;
- a log writing module 426, for writing update records to a log file, such as the shared log files 320, 322 described above;
- a garbage collection module 428 for garbage collecting (i.e., deleting) data that exceeds in number or age the data retention rule or parameters specified for a column family;
- a compaction module 430, for compacting or combining locality group files 300, 302, as described above; and
- a tablet splitting/merging module 432, for splitting tablets to increase the number of tablets or merging tablets to decrease the number of tablets.

As described elsewhere in this document, memory 410 of a data or tablet server may also store a number of files and data structures, including tablet files (i.e., locality group files 300, 302), one or more memory state arrays 310, and shared log files 320, 322. Optionally, memory 410 may also store one or more metadata tablets 170, each of which may include one or more sets of locality group files.

Each of the above identified elements of FIG. 6 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 410 may store a subset of the modules and data structures identified above. Furthermore, memory 410 may store additional modules and data structures not described above.

Although FIG. 6 shows a data or tablet server, FIG. 6 is intended more as functional description of the various features which may be present in a data or tablet server, or set of such servers, than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers.

Locality Groups

The table data structure may be divided (at least conceptually) into locality groups. A locality group is a grouping of one or more columns of the table data structure. In some embodiments, locality groups may be used to group columns that are often accessed together in data access operations, such that data that are often accessed together for a particular operation can be segregated from extraneous data with respect to that particular operation. This reduces the amount of extraneous data that is scanned during that particular operation.

Columns may be assigned to a locality group one at a time. In some embodiments, groups of columns as assigned to locality groups by assigning column families to locality groups. Assigning a column family to a locality group assigns all of the columns in the column family to the locality group. Not only is this a faster way to assign columns to locality groups, this ensures that related columns are stored together in the same locality group files. A locality group may have one or more column families. If a column or a column family is not explicitly assigned to a locality group, it may be assigned automatically to a default locality group. A column family may be assigned to a locality group by specifying in the column family metadata the name or identifier of the locality group to which the column family is assigned.

A column or a column family may be assigned to another locality group at any time (e.g., by changing the assigned locality group name or identifier in the corresponding column family metadata). The new assignment need not take effect immediately.

As described above, a table data structure may be logically divided into tablets. The division into tablets may be combined with the division into locality groups to form the locality group files that are the basis for physical storage in the system. A locality group file includes the data of the columns in the corresponding locality group, within a corresponding tablet. As described above, in relation to FIG. 5A, the locality group files for a particular locality group may include a main or base file and one or more update files.

Figure 7A:
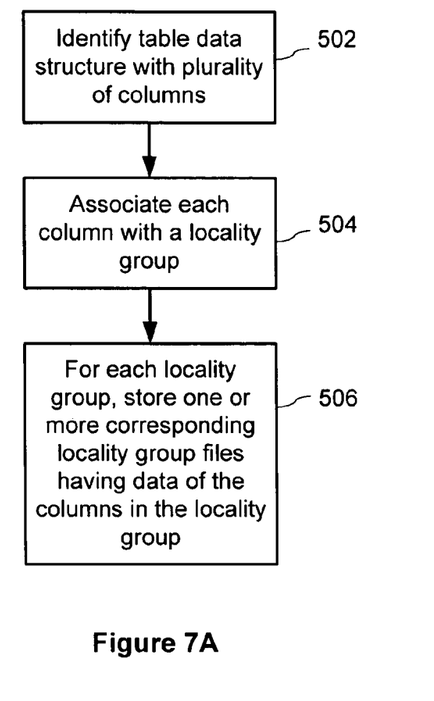
FIGS. 7A and 7B are flow diagrams illustrating processes for storing a table data structure as a set of locality group files, according to some embodiments of the invention.

FIGS. 7A and 7B are flow diagrams illustrating processes for storing a table data structure as a set of locality group files, according to some embodiments of the invention. In FIG. 7A, a table data structure with a plurality of columns is identified (502). Each column is associated with one of a plurality of locality groups (504). Particular locality groups may be defined by a user. Columns not associated with a user-defined locality group may be associated with a default locality group. For each locality group, one or more locality group files (e.g., a set of base and update files for each tablet of the table data structure) are stored (506), thereby partitioning the table data structure into one or more locality groups. The locality group files include data contained within the columns associated with the corresponding locality group.

Figure 7B:
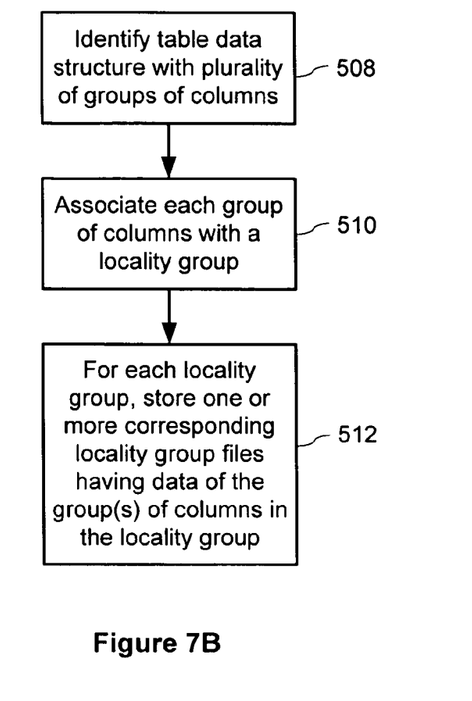

In FIG. 7B, a table data structure with a plurality of non-overlapping groups of columns (e.g., the column families described above) is identified (508). Each group of columns is associated with one of a plurality of locality groups (510). Particular locality groups may be defined by a user. Groups of columns not associated with a user-defined locality group may be associated with a default locality group. For each locality group, one or more locality group files (e.g., a set of base and update files for each tablet of the table data structure) are stored (512), thereby partitioning the table data structure into one or more locality groups. The locality group files include data contained within the group(s) of columns associated with the corresponding locality group.

Figure 8:
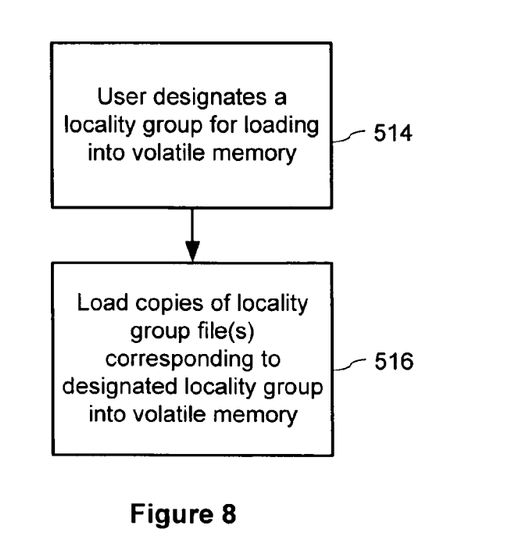
FIG. 8 is a flow diagram illustrating a process for copying locality group files associated with a locality group to volatile memory based on a user designation, according to some embodiments of the invention.

FIG. 8 is a flow diagram illustrating a process for copying locality group files associated with a locality group to volatile memory based on a user designation, according to some embodiments of the invention. In some embodiments, the locality group files corresponding to a locality group may be designated by a user for loading into volatile memory (such as DRAM, SRAM, DDR RAM, or other random access memory) and keeping the files in volatile memory. This may help provide more efficient access to frequently accessed locality groups.

A user designates a locality group for loading into and keeping in volatile memory (514). The designation may be maintained in the locality group metadata. In some embodiments, the designation may be made by setting the location flag 241 corresponding to the locality group. Based on the designation, a server (or servers) having locality group files corresponding to the designated locality group loads the locality group files into volatile memory and keeps them in volatile memory (516).

Figure 9A:
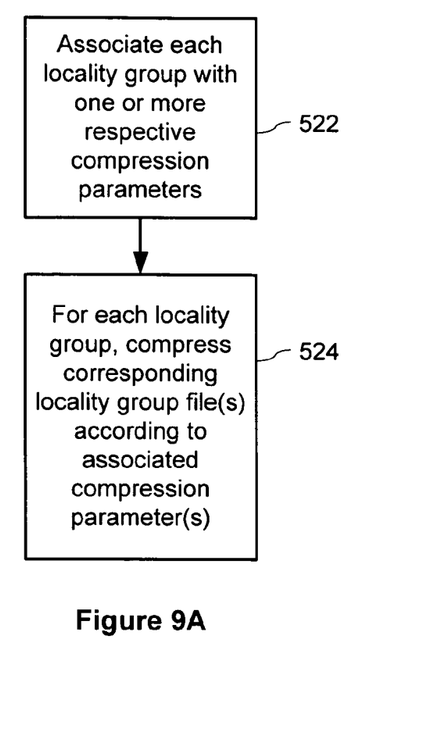
FIGS. 9A and 9B are flow diagrams illustrating processes for associating compression parameters with locality groups and compressing corresponding locality group files in accordance with the compression parameters, according to some embodiments of the invention.
Figure 9B:
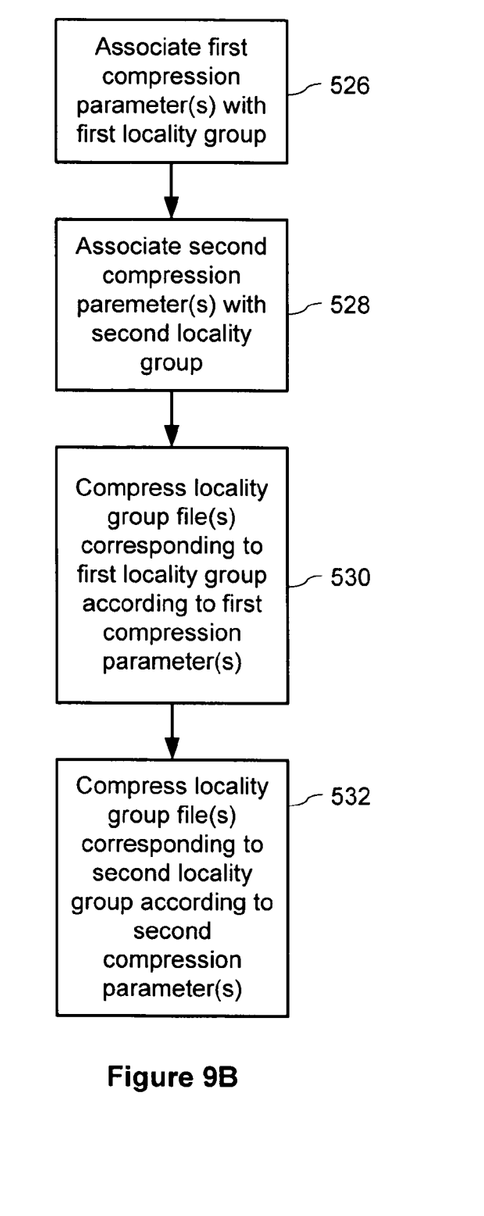

FIGS. 9A and 9B are flow diagrams illustrating processes for associating compression parameters with locality groups and compressing corresponding locality group files in accordance with the compression parameters, according to some embodiments of the invention. In FIG. 9A, each locality group is associated with one or more respective compression parameters (522). The compression parameters associated with each locality group may be stored in the locality group metadata, as described above, in relation to FIG. 4A. For each locality group, the corresponding locality group files are compressed according to the respective associated compression parameters (524). The compression may be performed using the data compression module 422.

In some embodiments, the keys in a locality group file are compressed using a delta or prefix encoding, while the values in a locality group file are compressed using a first dictionary based compression method designed to locate long common strings in the input. The resulting compressed keys and values are then compressed a second time using a second dictionary based compression method. The first dictionary based compression utilizes a first dictionary of unlimited size and a search window that includes all values of the data set previously encoded by the compression method. The second dictionary based compression utilizes a second dictionary of limited size (e.g., 16,384 entries). Furthermore, each dictionary entry of the second dictionary is associated with a smaller quantity of input data (e.g., four bytes) than the each dictionary entry of the first dictionary (e.g., 32 bytes per dictionary entry). In some embodiments, the first dictionary based compression utilizes the Bentley-McIlroy data compression method or a compression method similar to the Bentley-McIlroy data compression method, while the second dictionary based compression utilizes the LZW (Lempel-Ziv-Welch) compression method or any similar compression method.

In FIG. 9B, a first set of one or more compression parameters is associated with a first locality group (526). A second set of one or more compression parameters is associated with a second locality group (528). The locality group files corresponding to the first locality group is compressed according to the first compression parameters (530). The locality group files corresponding to the second locality group is compressed according to the second compression parameters (530).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with Various modifications as are suited to the particular use contemplated.

What is claimed is:

1. A computer-implemented method of storing data, comprising:

in a distributed computer system comprising a plurality of data servers:

identifying a table data structure, the table data structure comprising tablets and groups of columns to store data, wherein the groups of columns are non-overlapping, and the tablets each comprise a distinct non-overlapping group of rows in the table data structure, wherein the tablets include first and second tablets, the tablets being distributed among the plurality of data servers;

associating each group of columns with a respective locality group of a plurality of locality groups, wherein the plurality of locality groups includes a first locality group associated with a first group of columns in the table data structure and a second locality group associated with a second group of columns in the table data structure;

for the first locality group, storing data from the first group of columns in a first plurality of files in computer memory that correspond to the first locality group, the plurality of files including at least one file for each tablet for which the first group of columns contains data, access to the at least one file for a respective tablet for which the first group of columns contains data being controlled by a respective data server of the plurality of data servers;

for the second locality group, storing data from the second group of columns in a second plurality of files in computer memory that correspond to the second locality group, the second plurality of files including at least one file for each tablet for which the second group of columns contains data, access to the at least one file for a respective tablet for which the second group of columns contains data being controlled by a respective data server of the plurality of data servers; wherein:

the first plurality of files is distinct from the second plurality of files; and respective files in the first plurality of files store only data in both the first group of columns and respective tablets, and respective files in the second plurality of files store only data in both the second group of columns and respective tablets.

2. The method of claim 1, including associating a first set of access properties with a first group of columns in the table data structure, associating a second set of access properties with a second group of columns in the table data structure, and controlling access to the data in the first and second groups of columns in accordance with the first and second sets of access properties.

3. The method of claim 1, further comprising storing in a column of the plurality of columns data having a plurality of data types.

4. A computer-implemented method of storing data, comprising:

in a distributed computer system comprising a plurality of data servers:

identifying a table data structure, the table data structure comprising a plurality of columns for storing data and a plurality of tablets, wherein each tablet comprises a distinct non-overlapping group of rows in the table data structure, wherein the plurality of tablets includes first and second tablets, the plurality of tablets being distributed among the plurality of data servers;

associating groups of one or more columns in the plurality of columns with respective locality groups of a plurality of locality groups, wherein the plurality of locality groups includes first and second locality groups;

storing data in the first tablet in a first plurality of files in computer memory, including storing data that is in both the first tablet and first locality group in a first file and storing data that is in both the first tablet and second locality group in a second file distinct from the first file, wherein the first tablet is accessed using a first data server of the plurality of data servers; and storing data in the second tablet in a second plurality of files that are distinct from the first plurality of files in computer memory, including storing data that is in both the second tablet and first locality group in a third file and storing data that is in both the second tablet and second locality group in a fourth file distinct from the third file, wherein the second tablet is accessed using a second data server of the plurality of data servers;

wherein the first file stores only data in both the first tablet and first locality group, the second file stores only data in both the first tablet and second locality group, the third file stores only data in both the second tablet and first locality group, and the fourth file stores only data in both the second tablet and second locality group.

5. The method of claim 4, wherein each locality group comprises a non-overlapping subset of the columns.

6. The method of claim 4, wherein each row has an associated row identifier and the rows are stored in an order determined by the row identifiers.

7. The method of claim 4, further comprising:

associating one or more first compression parameters with the first locality group; and associating one or more second compression parameters with the second locality group, wherein the one or more second compression parameters are distinct from the one or more first compression parameters.

8. The method of claim 7, further comprising:

compressing one or more first locality group files corresponding to the first locality group in accordance with the first compression parameters; and compressing one or more second locality group files corresponding to the second locality group in accordance with the second compression parameters.

9. The method of claim 4, further comprising associating each of the plurality of locality groups with one or more distinct respective compression parameters.

10. The method of claim 9, further comprising compressing one or more locality group files corresponding to the respective locality group according to the respective compression parameters.

11. The method of claim 4, further comprising loading a respective file into volatile memory based on a user designation for the respective tablet and the respective locality group.

12. The method of claim 4, further comprising storing in a column of the plurality of columns data having a plurality of data types.

13. A computer system to organize data, comprising:

a set of interconnected computers each having storage;

a table data structure stored in computer memory, the table data structure comprising a plurality of columns to store data and a plurality of tablets, wherein each tablet comprises a distinct non-overlapping group of rows in the table data structure, wherein the plurality of tablets includes first and second tablets;

metadata associating groups of one or more columns in the plurality of columns with respective locality groups of a plurality of locality groups, wherein the plurality of locality groups includes first and second locality groups, and wherein each locality group comprises a non-overlapping subset of the columns;

executable instructions, executable by one or more of the computers, to store data in the first tablet in a first plurality of files including storing data that is in both the first tablet and first locality group in a first file and storing data that is in both the first tablet and second locality group in a second file distinct from the first file; and executable instructions, executable by one or more of the computers, to store data in the second tablet in a second plurality of files that are distinct from the first plurality of files including storing data that is in both the second tablet and first locality group in a third file and storing data that is in both the second tablet and second locality group in a fourth file distinct from the third file;

wherein the first file stores only data in both the first tablet and first locality group, the second file stores only data in both the first tablet and second locality group, the third file stores only data in both the second tablet and first locality group, and the fourth file stores only data in both the second tablet and second locality group.

14. The system of claim 13, further comprising:
metadata associating one or more first compression parameters with the first locality group and one or more second compression parameters with the second locality group, wherein the one or more second compression parameters are distinct from the one or more first compression parameters; and
executable instructions, for execution by one or more of the computers in the set of interconnected computers, to compress one or more locality group files corresponding to a respective locality group according to the respective compression parameters.

15. The system of claim 13, further comprising:
metadata associating each of the plurality of locality groups with one or more distinct respective compression parameters; and
executable instructions, for execution by one or more of the computers in the set of interconnected computers, to compress one or more first locality group files corresponding to the first locality group in accordance with the first compression parameters and to compress one or more second locality group files corresponding to the second locality group in accordance with the second compression parameters.

16. A computer program product usable in conjunction with a distributed computer system comprising a plurality of data servers, the computer program product comprising a computer readable storage medium and a computer program mechanism embedded therein, the computer program mechanism comprising instructions to:
identify a table data structure, the table data structure comprising a plurality of columns for storing data and a plurality of tablets, wherein each tablet comprises a distinct non-overlapping group of rows in the table data structure, wherein the plurality of tablets includes first and second tablets, the plurality of tablets being distributed among the plurality of data servers;
associate groups of one or more columns in the plurality of columns with respective locality groups of a plurality of locality groups, wherein the plurality of locality groups includes first and second locality groups;
store data in the first tablet in a first plurality of files in computer memory, including instructions to store data that is in both the first tablet and first locality group in a first file and store data that is in both the first tablet and second locality group in a second file distinct from the first file, and further including instructions to access the first tablet using a first data server of the plurality of data servers; and
store data in the second tablet in a second plurality of files in computer memory that are distinct from the first plurality of files, including instructions to store data that is in both the second tablet and first locality group in a third file and store data that is in both the second tablet and second locality group in a fourth file distinct from the third file, and further including instructions to access the second tablet using a second data server of the plurality of data servers;
wherein the first file stores only data in both the first tablet and first locality group, the second file stores only data in both the first tablet and second locality group, the third file stores only data in both the second tablet and first locality group, and the fourth file stores only data in both the second tablet and second locality group.

* * * * *